United States Patent Office 3,252,766
Patented May 24, 1966

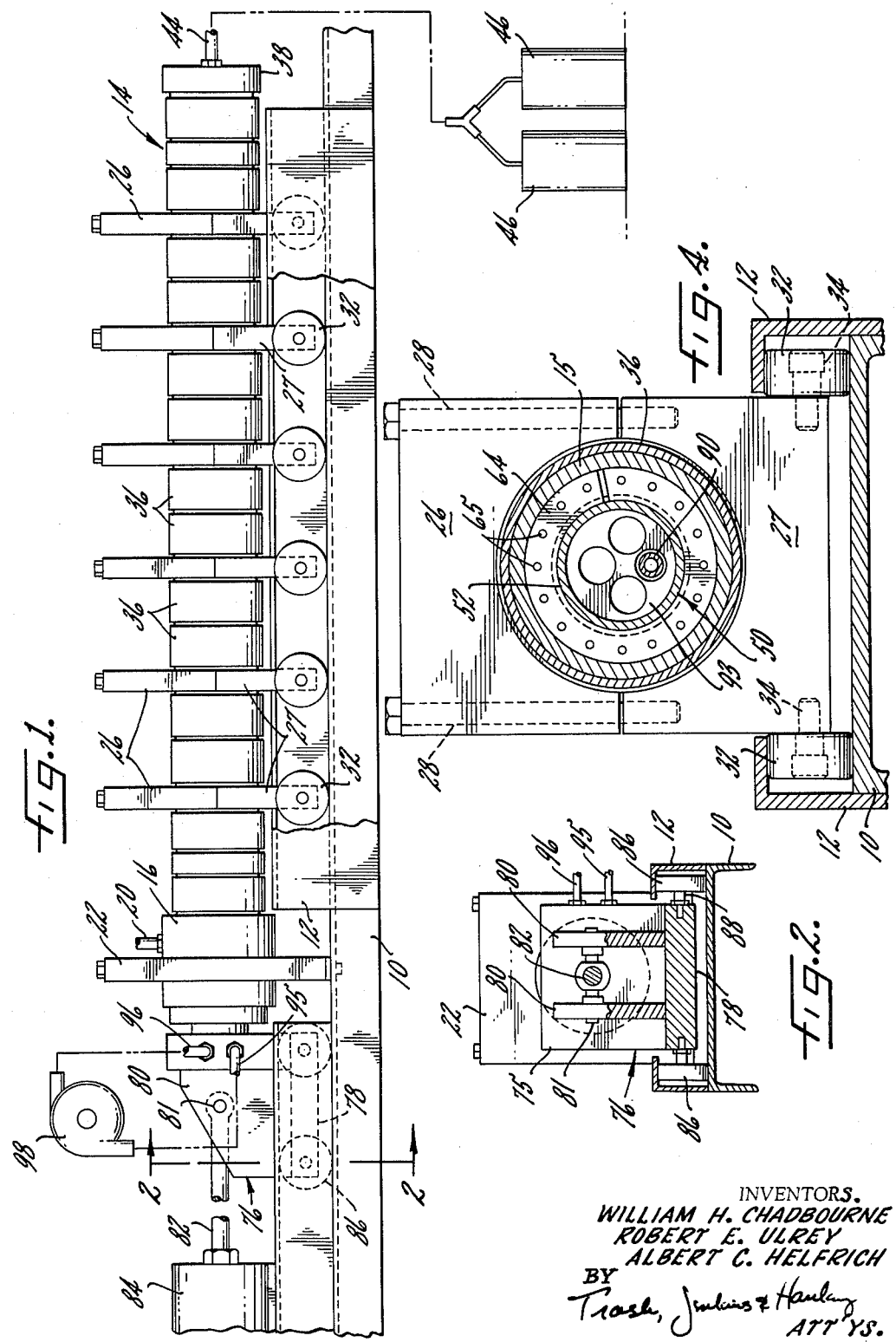
INVENTORS.
WILLIAM H. CHADBOURNE
ROBERT E. ULREY
ALBERT C. HELFRICH
BY
ATT'YS.

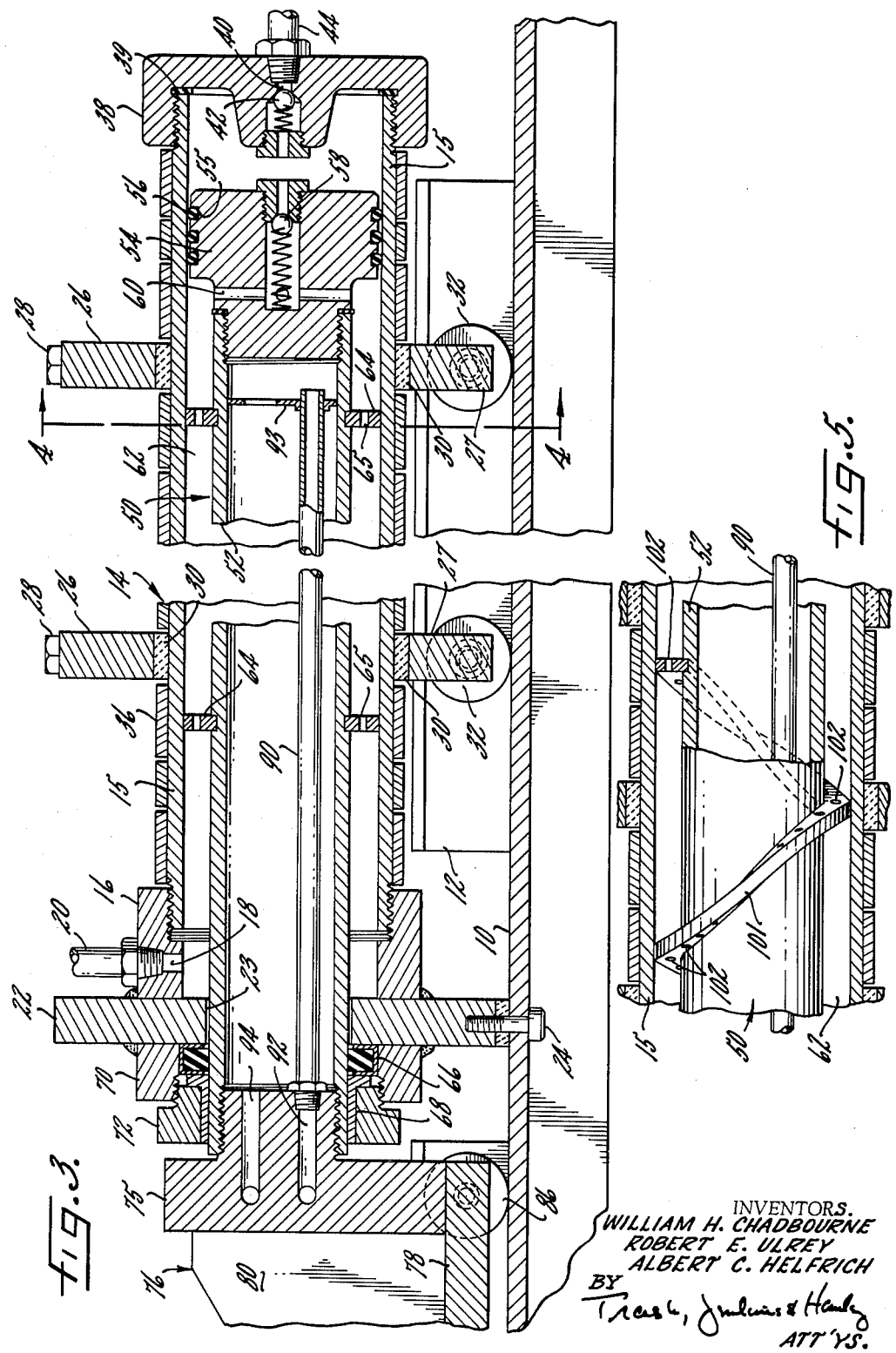

3,252,766
CONTINUOUS REACTOR
William H. Chadbourne, Robert E. Ulrey, and Albert C. Helfrich, Evansville, Ind., assignors to Fiberfil, Inc., Evansville, Ind., a corporation of Indiana
Filed Oct. 28, 1963, Ser. No. 319,353
11 Claims. (Cl. 23—284)

This invention relates to a continuous reactor, and more particularly to an apparatus for continuously processing a reactant or plurality of reactants.

It is an object of the invention to provide a reactor which will provide a reaction chamber, which will continuously move the material or materials to be reacted through said reaction chamber, which will provide controlled temperature conditions within said reaction chamber, which will have but limited space requirements and can be operated with but limited manpower requirements.

According to one form of the invention, there is provided a supporting frame to which one end of an elongated conduit is fixedly connected, said conduit being movably supported on said frame along the remainder of its length. The conduit is provided with axially spaced inlet and outlet ports. The inlet port is provided with valve means and is connected to a supply of the reactants to be processed.

An axially reciprocal piston is carried within the conduit and is provided with a head in sealing engagement with the inner conduit wall between the inlet and outlet ports. The piston shaft projects outwardly from the conduit end adjacent the outlet port for connection to drive means which reciprocally moves said piston axially of the conduit. The shaft is in spaced relationship to the conduit with the adjacent walls of said shaft and conduit defining an elongated reaction chamber. Desirably, heating means are carried within the shaft to heat the walls of the shaft defining the inner wall of the reaction chamber, and heating means are also disposed around the conduit to effect heating of the outer wall of the reaction chamber.

The piston head is provided with valve means operatively interconnected with passages extending through said head to the reaction chamber. The inlet port valve means and head valve means are in open and closed positions, respectively, as the piston is moved away from said inlet port for admitting the reactants into the conduit between the piston head and inlet port. Conversely, the inlet port valve means and piston head valve means are in closed and open positions, respectively, as said piston is moved toward the inlet port for thus forcing the reactants through the piston head into the reaction chamber. Apertured wipers are axially mounted along the shaft and slidably engage the inner wall of the conduit to mix the reactants within the reaction chamber and prevent the reactants from adhering to the outer chamber walls. The stroke rate of the piston is adjusted such that the reaction will reach the desired stage when the reactants are moved the length of the reaction chamber and discharged through the outlet port.

Other objects and features of the invention will become apparent from the more detailed description which follows and from the accompanying drawings, in which:

FIG. 1 is a side elevation of a reactor embodying the invention;

FIG. 2 is a vertical section taken on the line 2—2 of FIG. 1;

FIG. 3 is an enlarged fragmentary axial section through the reactor shown in FIG. 1;

FIG. 4 is a vertical section taken on the line 4—4 of FIG. 3; and

FIG. 5 is a fragmentary axial section of the reactor showing a modified form of the piston wiper construction.

As shown in the drawings, there is provided an elongated supporting frame 10 having a pair of opposed upwardly and inwardly directed arms 12 mounted along the longitudinal edges of its upper face. The frame 10 and arms 12 act in combination with each other to provide a pair of elongated tracks extending along the longitudinal edges of the frame 10.

An elongated conduit 14 is carried on the frame 10. Said conduit comprises a pipe 15 rigidly connected at one of its ends to an annular bushing 16 provided with an outlet port 18 connected to a discharge pipe 20. The bushing 16 is fixedly connected to a plate 22 having a centrally formed aperture 23 and fixedly mounted on the frame 10 by bolts 24 for thus rigidly interconnecting one end of the conduit 14 to said supporting frame. Preferably, the outlet port 18 is disposed closely adjacent the plate 22. A plurality of axially spaced pairs of plates 26 and 27 having opposed semicircular recesses formed therein are disposed along the length of the conduit 14. The plates 26 and 27 in each pair are interconnected by bolts 28, and the openings formed by their opposed recesses are lined with annular strips of insulation 30. The strips 30 are bindingly retained on the conduit 14 by the bolts 28 and insulate the plates 26 and 27 from said conduit. As shown in FIG. 4, a pair of rollers 32 are rotatably connected to the opposed sides of each plate 27 by bolts 34. Said rollers acting through the plates 26 and 27 support the conduit 14 in the tracks formed by the frame 10 and arms 12 to permit said conduit to be axially extended and retracted in fixed horizontal and vertical planes along the supporting frame with respect to its fixed interconnection to said frame provided by the plate 22. For reasons that will become more apparent hereinafter, a plurality of annular heating elements 36 are banded around the conduit 14 along the length thereof.

The end of the pipe 15 remote from the plate 22 is closed by an end cap 38 threadably mounted thereon with a gasket 39 interposed between the end cap 38 and pipe 15 to prevent leakage at their interconnection. The end cap 38 is provided with an inlet port 40 in which a normally closed check valve 42 is seated. The inlet port 40 is connected by a feed line 44 to a source of supply 46 of the reactants which are to be processed in the reactor.

Carried within the pipe 15 is a piston 50 comprising a shaft 52 connected at one of its ends to a head 54. As shown, the head 54 has a plurality of axially spaced annular recesses 55 in which rings 56 are seated to provide a seal between the head 54 and the inner wall of the pipe 15. A check valve 58 is also mounted in the head 54 and is disposed in open communication with the space between the head 54 and conduit end cap 38 and a plurality of radially extending passages 60 extending into the space between the shaft 52 and pipe 15. The shaft 52 is disposed in radially spaced relationship with the pipe 15 so that the adjacent annular walls of said shaft and pipe form an annular reaction chamber 62 having a length equal to the distance between the head 54 and the plate 22. A plurality of annular wipers 64 disposed in sliding engagement with the inner wall of the pipe 15 are press-fitted into axially spaced recesses formed along the length of the shaft 52. Each of the wipers 64 is provided with a plurality of axially extending openings 65 extending around its entire annular extent. The end of the shaft 52 opposite the head 54 projects through the plate opening 23 and is journaled in a packing ring 66 and bushing 68. As shown, said packing ring and bushing are retained in sealing engagement with the shaft 52 by a sleeve 70 fixedly mounted on the plate 22 and threadably connected to a collar 72.

The shaft 52 is threadably connected to the front wall 75 of a truck 76 carried on the frame 10. Said truck has a floor 78 provided with a pair of laterally spaced, upwardly projecting ribs 80 connected to the front wall 75. The ribs 80 support a cross pin 81 to which the ram 82 of a cylinder 84 mounted on the frame 10 is swingably connected. In order to movably support the truck 76 on the frame, a pair of longitudinally spaced rollers 86 are connected by axles 88 to the lateral faces of the base 78. As shown, the rollers 86 are retained in the tracks formed by the frame 10 and arms 12 for thus retaining the truck in a fixed horizontal and vertical orientation as it is reciprocated to the left and right as viewed in FIG. 1 by the cylinder 84.

In order to heat the interior of the piston shaft 52 and thus the inner wall of the reaction chamber 62, a tube 90 extends substantially the length of the shaft 52 with one of its ends terminating adjacent the head 54 and its opposite end threadably connected to an inlet passage 92 formed in the truck front wall 75. Conveniently, the end of the tube 90 adjacent the head 54 is supported in a spider 93 fixedly mounted within the shaft 52. A second passage 94 constituting an outlet passage is also provided in the truck wall 75. The inlet and outlet passages 92 and 94 are connected through flexible couplings 95 and 96, respectively, to a pump 98 connected to a source of a heated fluid (not shown). In this manner, the pump 98 will force the heated fluid through the conduit 95 and the tube 90, and said heated fluid will circulate through the interior of the shaft 52 and then be returned to the pump through the outlet passage 94 and conduit 96. The heating elements 36 and the heated fluid circulating through the shaft 52 will thus provide a controlled temperature condition in the reaction chamber 62. However, any thermal expansion of the conduit 14 resulting from elevated temperatures in the reaction chamber will merely cause said conduit to move axially along the supporting frame on the rollers 32.

In some reactions, it may be desirable to provide means for causing the reactants to move circumferentially around the reaction chamber 62 as they are moved therethrough. To this end, the embodiment shown in FIG. 5 causes the reactants to be moved circumferentially around the chamber 62, and differs from the reactor shown in FIGS. 1–4 only in the construction of the wipers. As shown in FIG. 5, the wipers are in the form of an open ended helix 101 fixedly mounted on the piston shaft 52 and spirally engaging the inner face of the pipe 15. With said helix extending axially along the shaft 52, it will insure a uniform mixing and circumferential movement of the reactants during their passage through the chamber 62 irrespective of their respective densities, reaction rates, etc. The helical path of movement of the reactants provided by the helix 101 will cause aid reactants to travel uniformly along the chamber 62 irrespective of their relative viscosities and will provide said chamber with a longer effective length. If desired, as to reduce back pressure, openings 102 may be provided in the helix.

The operation of the reactor shown in FIGS. 1–4 may be described as follows: Movement of the piston 50 to the left as viewed in FIG. 3 will cause the check valve 58 to remain closed and the check valve 42 to open, thereby permitting the reactants to move through the line 44 and inlet port 40 into the conduit between said inlet port and the piston head 54. During such movement to the left, the reactants within the reaction chamber 62 will be advanced to the left toward the outlet port 18 by the wipers 64. As the reactants are advanced toward the outlet port, those reactants immediately adjacent said outlet port will be displaced out through the discharge pipe 20.

On the return stroke of the piston to the right as viewed in FIG. 3, the check valve 42 will close and the check valve 58 will open. This causes the reactants interposed between the head 54 and inlet port 40 to move through the passages 60 in the head 54 into the reaction chamber 62, whereupon said reactants will be advanced toward the outlet port 18 as the piston is again moved to the left.

As the piston is moved to the right, the reactants within the chamber 62 will pass through the openings 65 in the wipers 64 so that upon movement of the piston to the left, said wipers again will be in position to advance said reactants toward the outlet 18. Desirably, the axial spacing between the wipers is less than the length of the stroke of the piston 50 to insure that the entire axial extent of the outer walls of the reaction chamber are cleaned during piston reciprocation. The retension time of the reactants within the chamber 62 is, of course, controlled by the cycling of the cylinder 84.

We claim:
1. A continuous reactor, comprising
 (a) an elongated conduit having axially spaced inlet and outlet ports, said inlet having a first valve means,
 (b) a piston carried in said conduit and having a head in sealing engagement with the inner conduit wall and a shaft in spaced relation to said inner conduit wall, the space between said shaft and wall defining a reaction chamber,
 (c) means for reciprocally moving said piston axially of said conduit,
 (d) second valve means in said piston head in operative communication with passages extending through said head to said reaction chamber,
 (e) said first and second valve means being open and closed, respectively, as said piston is moved away from said inlet port for admitting reactants into the space between said head and inlet port, and being closed and open, respectively, as said piston is moved toward said inlet port for forcing said reactants into said reaction chamber, and
 (f) an open-ended helix having a plurality of openings formed therein mounted axially along said shaft for movement therewith and slidably engaging the outer walls of said reaction chamber during piston reciprocation.

2. A continuous reactor, comprising
 (a) an elongated supporting frame,
 (b) an elongated conduit fixedly interconnected to said frame at one of its ends and movably supported on said frame along the remainder of its length,
 (c) said conduit having axially spaced inlet and outlet ports with said inlet port having a first valve means,
 (d) a piston carried in said conduit and having a head in sealing engagement with the inner conduit wall and a shaft in spaced relation to said inner conduit wall, the space between said shaft and wall defining a reaction chamber,
 (e) means for reciprocally moving said piston axially of said conduit,
 (f) means for heating said conduit and shaft along the lengths thereof to effect heating of said reaction chamber,
 (g) second valve means in said piston head in operative communication with passages extending through said head to said reaction chamber,
 (h) said first and second valve means being open and closed, respectively, as said piston is moved away from said inlet port for admitting reactants into the space between said head and inlet port, and being closed and open, respectively, as said piston is moved toward said inlet port for forcing said reactants into said reaction chamber, and
 (i) wiper means mounted on said shaft for movement therewith and slidably engaging the outer walls of said reaction chamber during piston reciprocation.

3. A continuous reactor as set forth in claim 2 in which said conduit comprises
 (a) an elongated pipe having one of its ends closed by a removable end cap provided with said inlet port and its opposite end removably connected to a bushing provided with said outlet port,
 (b) said bushing being fixedly mounted on a plate mounted on said frame for fixedly interconnecting the conduit to said frame and closing the opposite end of said pipe.

4. A continuous reactor, comprising
(a) an elongated supporting frame,
(b) an elongated conduit fixedly interconnected to said supporting frame at one of its ends and movably supported on said frame along the remainder of its length on a plurality of axially spaced supporting elements,
(c) said conduit having axially spaced inlet and outlet ports with said inlet port having a first valve means,
(d) a piston carried in said conduit and having a head in sealing engagement with the inner conduit wall and a shaft in spaced relation to said inner conduit wall, the space between said shaft and wall defining a reaction chamber,
(e) a truck movably supported on said supporting frame and connected to the end of the piston remote from said head,
(f) track means on said supporting frame for guiding the movements of said conduit and truck,
(g) means for reciprocally moving said truck and piston,
(h) means for heating said conduit and shaft to effect heating of said reaction chamber,
(i) second valve means in said piston head in operative communication with passages extending through said head to said reaction chamber,
(j) said first and second valve means being open and closed, respectively, as said piston is moved away from said inlet port for admitting reactants into the space between said head and inlet port, and being closed and open, respectively, as said piston is moved toward said inlet port for forcing said reactants into said reaction chamber, and
(k) wiper means mounted on said shaft for movement therewith and slidably engaging the outer walls of said reaction chamber during piston reciprocation.

5. A continuous reactor as set forth in claim 4 in which said heating means comprises
(a) a plurality of heating elements extending around said conduit and means within said shaft for the movement of heated fluid therethrough.

6. A continuous reactor as set forth in claim 5 in which said means within said shaft comprises
(a) an elongated tube connected to an inlet passage in said truck at one of its ends and having its opposite end in open communication with the interior of said shaft adjacent said head, and
(b) an outlet passage in said truck in open communication with the interior of said shaft,
(c) said inlet and outlet passages being connected to a pump connected to a source of said heated fluid.

7. A continuous reactor as set forth in claim 4 in which said truck comprises
(a) a floor having a plurality of rollers mounted thereon,
(b) a front wall removably connected to said floor and shaft, and
(c) a pair of laterally spaced ribs bracing said floor and front wall and carrying a cross pin swingably interconnected to said means for reciprocally moving said truck.

8. A continuous reactor comprising
(a) an elongated supporting frame having a pair of opposed elongated members mounted on said frame and projecting upwardly and inwardly therefrom,
(b) an elongated conduit fixedly connected to said supporting frame at one end of its ends and supported along the remainder of its length in a plurality of axially spaced plates carried on rollers riding on said frame,
(c) said conduit having axially spaced inlet and outlet ports with said inlet port having a first valve means,
(d) a piston carried in said conduit and having a head in sealing engagement with the inner conduit wall and a shaft in spaced relation to said inner conduit wall, the space between said shaft and wall defining a reaction chamber,
(e) a truck having rollers riding on said frame and connected to the shaft end remote from said head,
(f) drive means for reciprocally moving said truck and piston,
(g) means for heating said conduit and shaft to effect heating of said reaction chamber,
(h) second valve means in said piston head in operative communication with passages extending through said head to said reaction chamber,
(i) said first and second valve means being open and closed, respectively, as said piston is moved away from said inlet port for admitting reactants into the space between said head and inlet port, and being closed and open, respectively, as said piston is moved toward said inlet port for forcing said reactants into said reaction chamber, and
(j) wiper means mounted on said shaft for movement therewith and slidably engaging the outer walls of said reaction chamber during piston reciprocation,
(k) said rollers on said plurality of plates and said truck riding within the lateral and vertical extents of said pair of opposed members for retaining said conduit and truck in fixed orientation during movement along said frame.

9. A continuous reactor, comprising
(a) an elongated supporting frame,
(b) an elongated conduit fixedly interconnected to said frame at one of its ends and movably supported on said frame along the remainder of its length,
(c) said conduit having axially spaced inlet and outlet ports with said inlet port having a first valve means,
(d) a piston carried in said conduit and having a head in sealing engagement with the inner conduit wall and a shaft in spaced relation to said inner conduit wall, the space between said shaft and wall defining a reaction chamber,
(e) means for reciprocally moving said piston axially of said conduit,
(f) means for heating said conduit and shaft along the lengths thereof to effect heating of said reaction chamber, and
(g) second valve means in said piston head in operative communication with passages extending through said head to said reaction chamber,
(h) said first and second valve means being open and closed, respectively, as said piston is moved away from said inlet port for admitting reactants into the space between said head and inlet port, and being closed and open, respectively, as said piston is moved toward said inlet port for forcing said reactants into said reaction chamber.

10. A continuous reactor, comprising
(a) an elongated supporting frame,
(b) an elongated conduit fixedly interconnected to said frame at one of its ends,
(c) a plurality of pairs of interconnected plates having opposed openings formed therein mounted on said conduit in axially spaced relationship,
(d) pairs of rollers mounted on said plates in engagement with said supporting frame for movably supporting said conduit on said frame for movement with respect to said one end,
(e) said conduit having axially spaced inlet and outlet ports with said inlet port having a first valve means,
(f) a piston carried in said conduit and having a head in sealing engagement with the inner conduit wall and a shaft in spaced relation to said inner conduit wall, the space between said shaft and wall defining a reaction chamber,
(g) means for reciprocally moving said piston axially of the conduit, (h) means for heating said conduit and shaft to effect heating of said reaction chamber,
(i) second valve means in said piston head in operative communication with passages extending through said head to said reaction chamber,
(j) said first and second valve means being open and closed, respectively, as said piston is moved away from said inlet port for admitting reactants into the space between said head and inlet port, and being closed and open, respectively, as said piston is moved toward said inlet port for forcing said reactants into said reaction chamber, and
(k) wiper means mounted on said shaft for movement therewith and slidably engaging the outer walls of said reaction chamber during piston reciprocation.

11. A continuous reactor as set forth in claim 10, in which
(a) strips of insulation are interposed between said plates and said conduit.

References Cited by the Examiner
UNITED STATES PATENTS
2,739,879   3/1956   Bates et al. _____ 23—252 X MORRIS O. WOLK, *Primary Examiner*
JAMES H. TAYMAN, Jr., *Examiner.*